United States Patent [19]

Schultz et al.

[11] 3,841,672

[45] Oct. 15, 1974

[54] TUBE COUPLING FOR SMOOTH WALLED TUBES

[75] Inventors: Carl D. Schultz, New Riegel; Robert D. Simonton; Clyde W. Stiger, both of Fremont, all of Ohio

[73] Assignee: Dale Products, Inc., Fremont, Ohio

[22] Filed: Mar. 2, 1973

[21] Appl. No.: 337,660

[52] U.S. Cl.............. 285/175, 285/39, 285/276, 285/317, 285/320, 279/97, 403/355, 403/379
[51] Int. Cl............................................. F16l 55/00
[58] Field of Search .......... 285/305, 308, 317, 320, 285/340, 34, 35, 39, 81, 277, 309, 346, 369, 372, 404, 175, 276; 279/97; 403/322, 323, 325, 327, 378, 379, 355

[56] References Cited
UNITED STATES PATENTS

| | | | |
|---|---|---|---|
| 1,815,407 | 7/1931 | Jones | 285/309 |
| 2,168,499 | 8/1939 | Spicacci | 403/379 |
| 2,320,397 | 6/1943 | Ross | 279/97 |
| 3,393,703 | 7/1968 | Richardson et al. | 285/153 |
| R18,395 | 3/1932 | Richard | 279/97 |

FOREIGN PATENTS OR APPLICATIONS

| | | | |
|---|---|---|---|
| 16,431 | 7/1895 | Great Britain | 403/378 |

Primary Examiner—Jordan Franklin
Assistant Examiner—Moshe I. Cohen
Attorney, Agent, or Firm—David H. Wilson

[57] ABSTRACT

A tube coupling for rapid, temporary connection to a smooth walled tube comprising a barrel having a tube receiving bore with an intersecting grip in the form of a pin transverse of the bore and rotatable between a bore clearing condition and gripping jaw extending position. Variations in the grip include a right circular cylindrical pin having a cut-away cusp transverse of the cylinder and conforming to the bore, intersecting facets defining gripping edges, multiple tube gripping points on a single pin, and plural grips in diametrical opposition across the bore. The coupling barrel has a quick release swivel fitting which can be joined to a hose. Compression seals are formed by an elastomeric body adapted to abut the end of the tube within the barrel to bias it against the over center orientation of the grip jaw and a backup member retaining the body in the barrel. The body can include a fluid passage which can communicate between the tube and a passage in the backup member. A bead protruding into the elastomeric body from the backup member and surrounding the passage therein augments the compressive seal to that member.

20 Claims, 10 Drawing Figures

TUBE COUPLING FOR SMOOTH WALLED TUBES

BACKGROUND OF THE INVENTION

1. Field of the Invention

This invention relates to couplings for tubes and more particularly for couplings which can be locked to the smooth walls of a tube stub for sealing engagement.

2. Description of the Prior Art

Heretofore it has been known to couple fluid conductors where one of the conductors has smooth walls. For example, in the manufacture and testing of refrigeration components such as compressors, condensers and evaporators it is known to couple fluid lines to the components for flushing and testing the fluid paths therein. Thus, a hot solvent, frequently an aqueous solution, is flushed through the components to remove solder flux and the components are then dried by passing hot air through them. Upon their completion they are subjected to pressure tests under pressures of the order of a thousand pounds per square inch. In each of these instances a connection is made from the manufacturing plant fluid supply to the component. Frequently, hoses are employed to provide some flexibility of manipulation to the production workers and these hoses are connected and disconnected as frequently as several times a minute. Ease of manipulation and sealing of the supply lines to the components and reliability of the seal and mechanical coupling at the pressures and liquid temperatures involved is essential.

Prior devices for coupling pressure lines to tubes have been of complex construction, delicate, bulky and subject to failure. Frequently, they have involved telescoped metal sleeves, screw threaded cap retainers, multiple seals employing O-rings fitted into circumferential grooves for embracing tube ends, and biasing springs for the internal sleeves in complex combination such as shown in Maisch U.S. Pat. No. 2,819,733 of Jan. 14, 1958 for "Tube Sealer and Connector" and Richardson et al. U.S. Pat. No. 3,393,703 of July 23, 1968, for "Device for Sealing and Connecting the Ends of Tubes."

In addition to the complexity of prior devices their locking mechanisms were such as to function only on tube lengths which were at times greater than optimum from the component manufacturers point of view. A favored lock comprised an apertured plate pivoted on one side of the coupler so that in one pivotal position the aperture admits a tube into the seal region of the coupler and in another pivotal position edges of the aperture bite into and grip the tube. Such an arrangement requires substantial axial length of coupler ahead of the grip lock and a significant seal length over which the tube must be advanced behind the grip lock such that effective seals cannot be made conveniently and rapidly to short tube stubs.

Processing stations in a plant are at times required to be adaptable to a variety of products and processes. In the case of stations at which pressurized fluid is imposed on the product such changes may involve changes of line connections to tube couplers or couplers to line connections. Prior art threaded screw connectors require a coupling-fitting unit for each combination. That is, if a different tube on the work product at the station is to be accommodated or a different fluid line is to be coupled to the work product, an entire unit had to be replaced.

SUMMARY OF THE INVENTION

In accordance with the above, one object of this invention is to improve tube couplings.

Other objects are to simplify the construction, increase the reliability, broaden the range of utilization, and reduce the size of tube couplings.

A further object is to reduce the required stub length of tubes to which a coupling is temporarily sealingly secured and which the coupling assembly requires for an effective gripping engagement.

Another object is to make fittings and couplings interchangeable and readily coupled and decoupled into suitable assemblies.

One embodiment of the invention comprises a cylindrical barrel having a tube receiving aperture formed in one end by an axial bore. An oversized bore extending from the coupling end opposite that for reception of the tube contains an elastomeric sleeve having an end adapted to abut the end of a tube inserted through the aperture and, when subjected to axial compressive forces, to form a fluid tight joint with the tube. A tube grip and lock mechanism is mounted on the coupling barrel to engage the wall of a tube inserted in the tube receiving aperture and secure that tube against withdrawal from the aperture. The grip comprises one or more edges of a cut-away cylinder or pin positioned in the barrel to intersect the axial bore receiving the tube. Biasing and control means for the grip pin permit its rotation about its longitudinal axis between a tube freeing position in which it clears the tube receiving axial bore and a tube gripping position in which edges of its cut away portion intersect that bore.

A pressure line in fluid communication with the barrel and its tube receiving bore is coupled to the distal end of the barrel from that bore. In order to accommodate the interchange of barrels and line couplings a fitting for the line includes a cylindrical end closely fitting within the enlarged bore of the barrel and having means for releasably locking the end within the bore. Enhanced freedom of motion of the coupling with respect to the line upon which the fitting is mounted is provided by a rotatable joint between the fitting and barrel. A circumferential groove in the fitting enables rotational freedom between the lock on the barrel and the fitting while maintaining the elements locked together. A fluid seal effective for the rotatable coupling is afforded by an annular bead on the annular end wall of the cylindrical end of the fitting. The bead bears upon and compressively engages the seal sleeve end opposite the tube engaging sleeve end to effect a seal to the fitting.

Axial length of the coupling is reduced by a fitting lock comprising a lock pin intersecting the enlarged bore of the barrel and having a cut-away portion which permits it to be clear of the bore where rotated to a release position. In the locked position the lock pin extends into the circumferential groove in the fitting.

DESCRIPTION OF THE PREFERRED EMBODIMENTS

Figure 1:
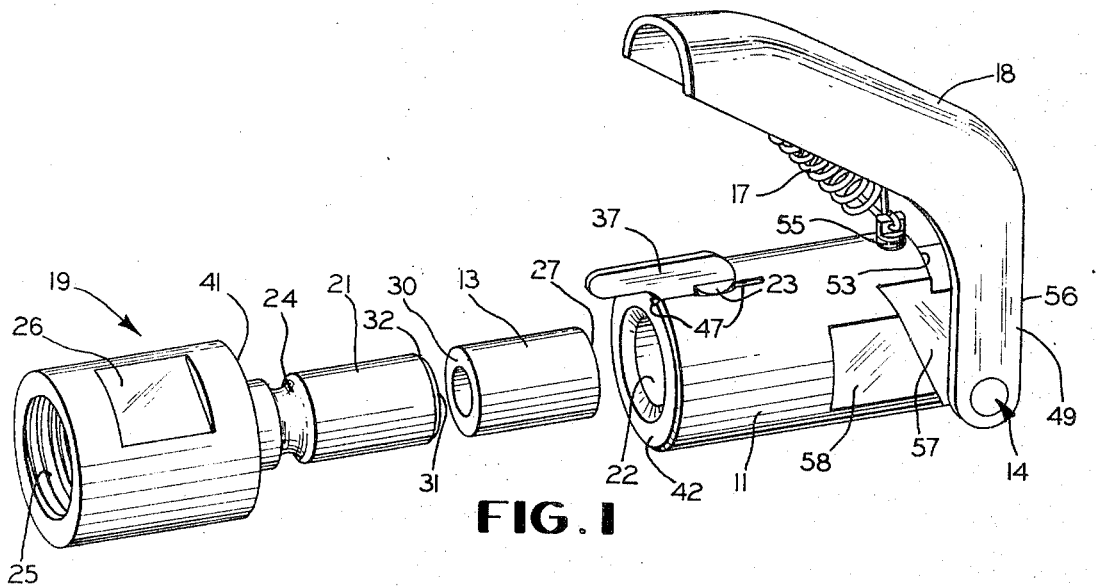
FIG. 1 is an exploded perspective of one form of coupling according to this invention.
Figure 2:
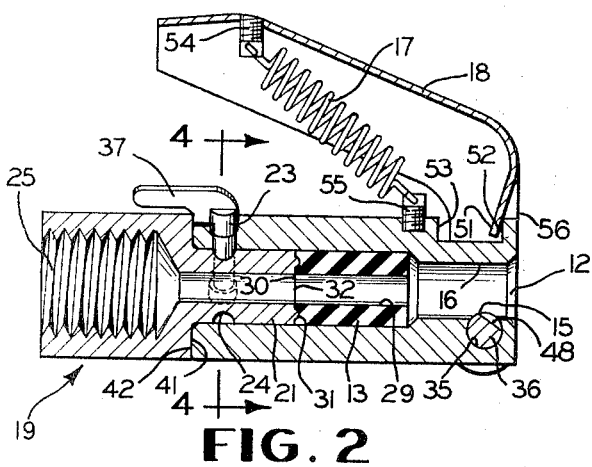
FIG. 2 is a sectioned longitudinal elevation of the coupling of FIG. 1.
Figure 3:
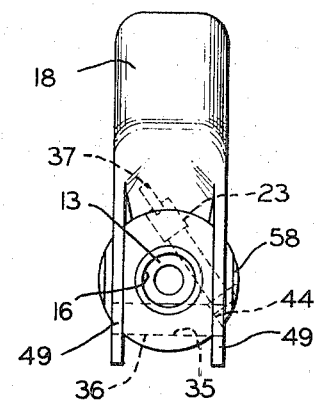
FIG. 3 is an end view of the coupling of FIG. 1 viewed from the tube receiving end.

As shown in FIGS. 1 through 5 of the drawings, one form of a coupling is formed of a barrel 11 adapted to receive the end of a tube through an aperture 12 at one end and to receive a seal sleeve 13 from its opposite end. A tube grip 14 is located adjacent the tube receiving end of the barrel so that its jaw 15 can be biased into tube receiving bore 16 by spring 17 and can be retracted from that bore by displacement of handle 18.

The coupling is employed to join flexible conduit, such as metal hose for high pressure utilizations, connected to a fluid supply (none of which is shown), with work product at a work station so that the fluid can be applied to a tube 10 on the work product. Thus, if fluid is to be passed through refrigeration system components, two connections are made to the components to admit the fluid to and receive the fluid from the components. In many applications the relatively stiff, high pressure, flexible hose carrying the fluid is subjected to substantial flexing and twisting manipulation in connecting the coupling. When high pressure is imposed through the hose further flexure and twisting occurs. The hose is therefore subject to frequent failure due to fatigue of its materials including the wire braid sheath where such is employed.

A stress relieving swivel connector 19 is sealingly coupled to the tube coupling by the insertion of a stub 21 into bore 22 in the end of barrel 11 opposite the tube receiving end. Lock pin 23 retains connector 19 in this relationship by fitting into a locking groove 24 which extends circumferentially around stub 21 to afford freedom of rotation of connector 19 relative to barrel 11 around their common longitudinal axes. Conventional screw type connections (not shown) can be made from fittings secured on the hose to the connector 19 by turning them into the threaded socket 25 on the connector. A pair of diametrically opposed wrench flats 26 are provided to facilitate the joining of connector 19 to a hose fitting.

Figure 5:
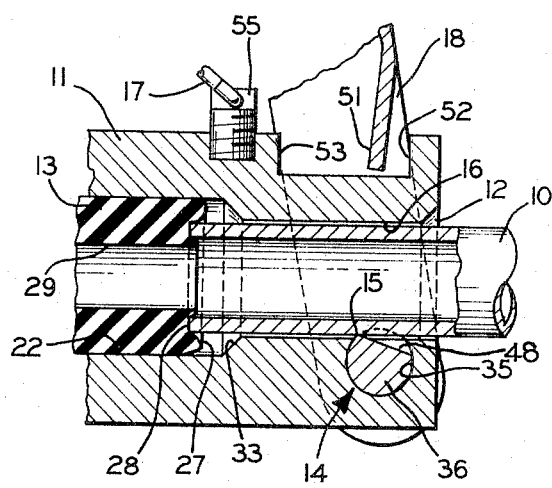
FIG. 5 is a fragmentary sectioned elevation of the coupling with a tube gripped therein in sealing relation.

Seals between the flat end of the tube to which the coupling is to be connected and the connector 19 are provided by the axial advance of the resilient sealing sleeve 13 relative to the tube end to displace the front end 27 of that sleeve and cause it to conform to and embrace the lips 28 at the end of the tube (as best seen in FIG. 5). Sleeve 13 has an internal passage 29 of slightly smaller cross-section than the internal cross-section of the tube 10 to permit fluid to flow therethrough with minimal impedance. Passage 29 is slightly smaller than the tube interior so that the annular end walls or lips 28 of the tube 10 can be encompassed by the annular end wall 27 of the sleeve as the tube imposes axially compressive forces whereby an effective seal is initially established. The opposite end 30 of sleeve 13 bears upon and under axial compression conforms to a circumferential sealing bead 31 on the annular end 32 of stub 21. By virtue of the coaxial arrangement of aperture 12, tube receiving bore 16, sleeve receiving bore 22, sleeve 13, sealing sleeve internal passage 29, annular end 32 and sealing bead 31, all fluid passages are aligned and all seal contact surfaces are in registry and in sealing contact for any angular position of the barrel 11 with respect to the tube 10 and any angular position of the connector 19 relative to the barrel 11.

In connecting the coupling to the tube 10, the tube 10 is inserted through aperture 12 and advanced to engage its end with and to axially compress the sealing sleeve 13. Sleeve 13 is closely confined by the walls of bore 22 extending beyond stub 21 to the shoulder 33 such that it is under slight axial compression between annular wall 32 and bead 31 at its rear end 30 and shoulder 33 at its tube end 27 when stub 21 is locked in barrel 11 by lock pin 23. The additional compression of sleeve 13 by the tube 10 enhances the sealing at each end. When pressure is imposed on the walls of internal passage 29 of sleeve 13 by the fluid passing through the coupling, the sealing pressure at each of ends 27 and 30 is further reinforced by the tendency to cause the radially confined elastomeric sleeve to flow or distort axially against the tube end 28 and sealing bead 31 and annular end 32.

Figure 4:
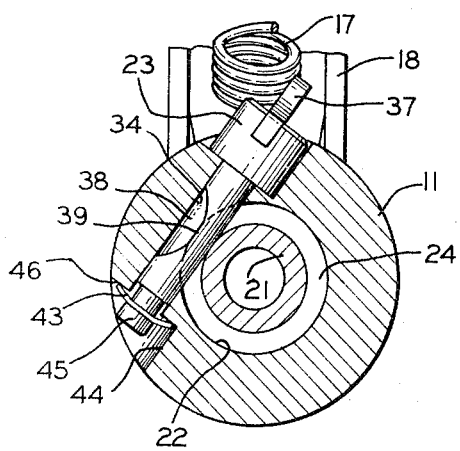
FIG. 4 is a cross-section of the coupling taken along the line 4—4 of FIG. 2.

Stud 21 and the integral swivel connector structure are locked to barrel 11 by lock pin 23 which is best seen in FIG. 4. A bore 34 along a chord of the circular cross section of barrel 11 at a depth to intersect axial bore 22 receives lockpin 23. Bore 34 is oriented at an angle of about 54° with respect to a bore 35 for tube grip pin 36 (to be discussed) in order that the exposed end of lock pin 23 and its handle 37 are located beneath the tube grip control handle 18 in a location which avoids interference with handle 18 and does not extend into a region normally grasped by an operator when applying the coupling to a tube 10. The lock pin 23 has its axis tangent to bore 22. A cut-away region 38 having a radius of curvature generally corresponding to the radius of bore 22 on centers which are spaced to provide an intermediate flat region 39 permits the pin to be cleared of bore 22 by rotating it 180° around its longitudinal axis from the position shown in FIG. 4. Circumferential groove 24 is formed with a semicircular cross-section having a radius of curvature corresponding to the cross-section of lock pin 23 to accommodate the pin when the stub 21 has been inserted into barrel 11 and has compressed sealing sleeve 13 so that shoulder 41 on connector 19 abuts the rear annular wall 42 of barrel 11.

Lock pin 23 is retained in bore 34 by a crowned spring lock washer 43 fitted within the cusp shaped recess 44 at the outer end of the bore 34 so that washer inner margins fit beneath flanged head 45 on lock pin 23 and its outer margins bear on land 46 at the bottom of recess 44. Pin 23 has a degree of freedom of longitudinal motion along bore 23 defined by the height of the crown of the lock washer 43. This biasing of the pin draws the length of its handle 37 extending across its width and beyond into a groove 47 paralleling the axes of barrel 11 and in the exterior wall of the barrel 11 whereby the greatest relaxation of the lock washer 43 occurs while the handle 37 is parallel to the barrel axis and the handle and groove combination provides a detenting action. This detent is in either the stub releasing position with cut-away 38 flush with the wall of bore 22 or with pin rotated 180° to the fully locked position in which it fits into groove 24.

Both the resilience of sealing sleeve 13 and the forces developed by fluid pressure on the sleeve tend to cause axial displacement of the coupling barrel 11 from the end of the tube upon which it is mounted. A tube gripping assembly 14 prevents such displacement. Grip pin 36 mounted in bore 35 in barrel 11 so that it intersects the tube receiving bore provides a tube gripping jaw 15 at the margin defining the intersection of its cylindrical surface with a cut-away region 48 of the pin. Handle 18 controls the position of jaw 15 by controlling the rotation of pin 36 in bore 35. Bifurcated ends 49 of handle 18 are fixedly secured to pin 36 and a depending wall 51 between those ends functions as a limit which cooperates with stops 52 and 53 to restrict the rotational motion of the handle 18 around the axis of pin 36. A biasing tension spring 17 is secured at 54 to the handle and at lug 55 to the barrel to impose a clockwise rotational torque on the handle as viewed in FIGS. 1, 3 and 5.

Cut-away 48 is an arcuate milled region on the side wall of the pin 36 and is so related to the mounting of pin on handle 18 that with the handle free end displaced to a position near the barrel it is flush with the tube receiving bore 16. Handle 18 is free to move through an arc of about 30°. When no tube is present in bore 16 jaw 15 has its maximum extension into the bore and handle 18 has its front face 56 perpendicular to the axes of bore 16. Handle 18 is biased by spring 17 to extend jaw 15. Bore 16 is arranged to closely fit the tube to be accommodated by the coupling. For example, where a tube having an outer diameter of 375 thousandths of an inch is to be accommodated, the diameter of bore 16 is of 380 thousandths of an inch, the lock pin is 250 thousandths of an inch in diameter and its axes is 285 thousandths of an inch from the center of the bore 16 so that it would define a chord 160 thousandths of an inch from the center of bore 16. A cut out 48 of 93 thousandths of an inch deep having a radius of curvature of 160 thousandths of an inch will engage a tube outer wall within bore 16 and cam against that tube backed by the opposite wall of bore 16 so that the sharp edge of the intersection of the cut-away region 48 and the cylindrical surface which forms jaw 15 bites into the tube wall. Any tendency to displace the tube outward of bore 16 enhances the gripping action by tending to rotate pin 36 and extend jaw 15 further into the tube wall since the jaw is over center with respect to the pin axis of rotation on the side opposite that toward which the tube is biased. In practice the bite of the jaw 15 is assured by milling the cut out region 48, then hardening pin 36 and grinding the surface to form a sharply defined edge. With this sharp edge extensible into the bore 16 about seven thousandths of an inch the coupling will accommodate variations of tube diameter over virtually that range.

It will be noted that the rotating lock pin permits the gripping jaw to be close to the end of the coupler barrel 11 without sacrifice in strength. In practice the axis of the quarter inch diameter pin is 0.177 inch from the barrel end.

Flats 57 on barrel 11 provide clearance for operation of the handle bifurcations 49 while flats 58 provide wrench flats.

Even greater tolerances in the diameter of the tubes to be accommodated can be provided by the multiple grip embodiments of FIGS. 6 through 10. In addition these multiple grip embodiments will effectively secure a shorter gripping length of tube, particularly where diametrically opposed jaws are provided.

Figure 6:
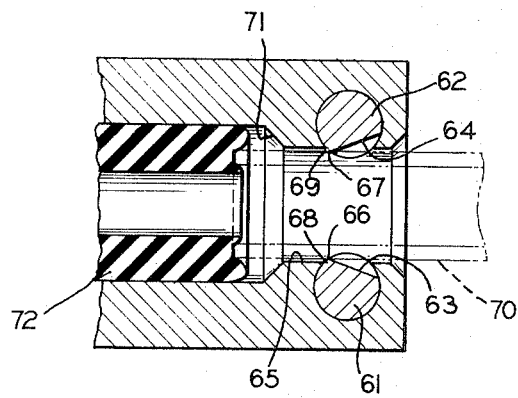
FIG. 6 is a sectioned fragment of the longitudinal elevation of a coupling showing opposed tube gripping elements according to this invention.

FIG. 6 illustrates diametrically opposed tube gripping pins 61 and 62 each having milled, hardened and ground cut outs 63 and 64 respectively which are of a form to enable them to be rotated to a position flush with or below the surface of tube receiving bore wall 65. Grip jaws 66 and 67 are sharp edges at the junction of the arcuate cut out regions 63 and 64 with the cylindrical walls 68 and 69 of the pins as in the case of pin 36 of FIGS. 1 through 5. They are shown in their tube gripping position for an inserted tube 70 shown in phantom section.

Two particular advantages of the double jawed construction are evident from a consideration of FIG. 6. Since jaws are opposed, the range of tube outer diameters accommodated for a given grip pin structure and mounting is twice that of a single jaw. This is accomplished by taking advantage of the range of depth of gripping positions inward from the limit defined by wall 65 available from each side and thus cumulative in their effect. Rather that a gripping action between a fixed wall and a movable jaw there is a convergence of jaws from both sides of the tube.

The length of tube receiving bore can be shortened with opposed jaws since the tube coupling relationship does not require the wall bearing on its length for stability of the gripping action. Hence, it will be noted that shoulder 71 against which the sealing sleeve 72 is maintained when no tube is inserted in the coupling is closer to the jaws thereby accommodating a shorter length of tube 70.

Figure 9:
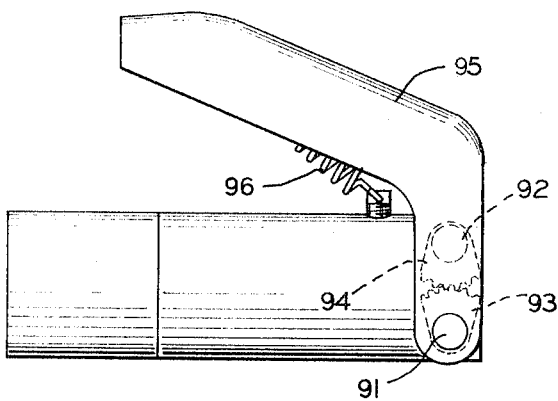
FIGS. 9 and 10 are side elevations of two forms of controls for opposed tube gripping elements for tube couplings.
Figure 10:
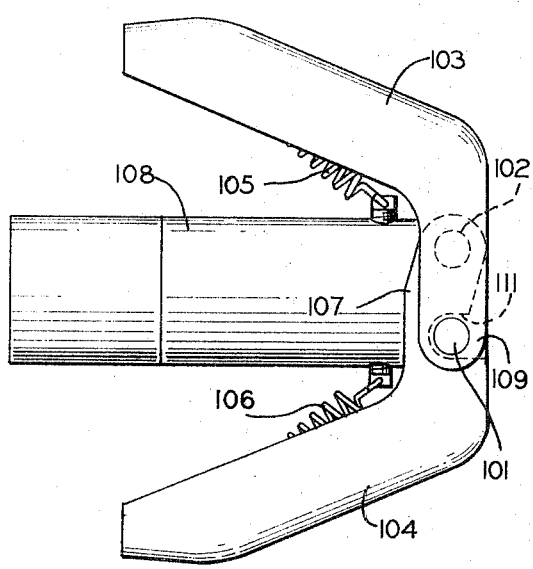

The means for rotating pins 61 and 62 has not been shown in FIG. 6. Two such means, adaptable for the control of the jaws of FIG. 6 or those of FIGS. 7 and 8 are shown in FIGS. 9 and 10 and will be discussed below.

Figure 7:
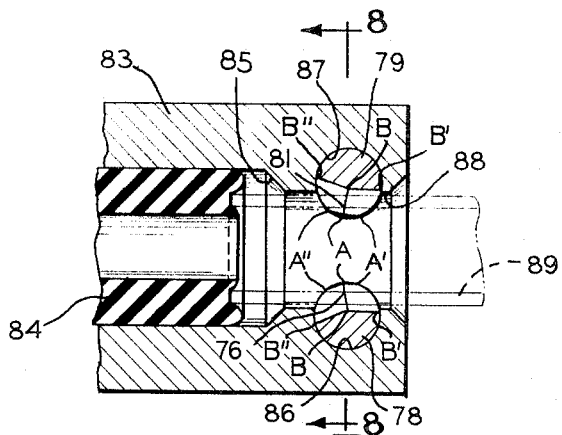
FIG. 7 is a sectioned fragment of the longitudinal elevation of a coupling having paired grip points on each opposed tube gripping element with the control handle, its limits, and biasing means omitted.
Figure 8:
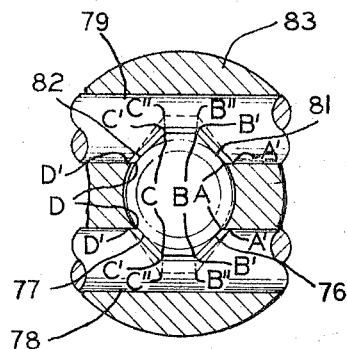
FIG. 8 is a fragmentary cross-section of the barrel and grip elements of FIG. 7 taken along line 8—8 thereof with the control handles omitted.

A geometry for achieving multiple spaced gripping regions 76 and 77 from a single grip pin 78 is shown in FIGS. 7 and 8. These figures illustrate this feature applied to opposed grip pins 78 and 79 with the further advantage that the gripping regions, at least for the ideal tube outer diameter accommodated by the coupling, provide regions engaging the tube in quadrature as 76 and 77 for pin 78, and 81 and 82 for pin 79, around its cross-section. In order to achieve this result the cut out region of the grip pin is tapered to form a central apex forming the grip edge which is inclined from the axis of rotation of the grip pin in opposition to the force to be restrained. This provides the over center grip action of the above described grip arrangements such that increase in force tending to separate the coupling from the tube increases the compressive force on the tube by causing the grip to close upon the tube thereby increasing gripping force. This is occasioned by the tendency of pin 79 to rotate counter clockwise while pin 78 rotates clockwise in response to a force biased to the right in FIG. 7.

In FIGS. 7 and 8 the coupling barrel 83 corresponds to the barrel of FIG. 6 and seal sleeve 84 in the unloaded condition abuts shoulder 85. Grip pins 78 and 79 are mounted to rotate in bores 86 and 87 so that their tube gripping crowns 76 and 81 can be rotated into and out of the projection of the walls of the tube receiving bore 88. The crowns or jaws 76 and 81 are formed from milled facets A–A'–B'–B and A–A''–B''–B defining intersection A–B and from milled facets D–D'–C'–C and D–D'' (not shown) –C''–C defining intersection D–C. These facets are shown as flats although it is to be appreciated they could be cusps if a longer line of contact with the tube is desired. Clearance from the tube at its vertical diameter as viewed in FIG. 8 is provided by facets B–B'–C'–C and B–B''–C''–C.

It is to be appreciated that a two point engagement of a gripping jaw can be achieved with a single grip pin and cut-away region with the use of appropriate spatial relationships of a pin such as 78 of FIGS. 7 and 8 in a bore such as for the single grip pin of FIGS. 1 through 5. Further, if the facets milled in the grip pin are cusps rather than planar, the length along which crowns 76 and 77 contact tube 89 can be extended.

Actuators for dual grip pins are shown in FIGS. 9 and 10. The rotation of grip pins 91 and 92 is coupled by meshing gear quadrants 93 and 94 driven by handle 95 and its grip extending, biasing spring 96 in FIG. 9. Independent rotation of grip pins 101 and 102 by independent handles 103 and 104 and independent bias springs 105 and 106 is shown in FIG. 10. Handle 104 has its bifurcated ends 107 lying between barrel 108 and bifurcated ends 109 of handle 103 cut-away in the region 111 of pin 101 to provide independent motion of the two grips.

It is to be appreciated that the coupling and seal can be employed for various fluids and that the materials of its elements are chosen to accommodate those fluids, and the conditions under which they are used. Neoprene and other synthetic elastomers can be employed of a durometer of from 40 to 60 with hot water, hot air and freon fluids. It has been found that the elastomer should be soft enough to yield to an effective seal when the coupling is applied to a tube manually. In order to increase life of the sealing sleeve, however, the elastomer should be hard. Thus a compromise between "feel" to the operator and life of the seal must be maintained. Stainless tool steel has been used for metal parts in the couplings.

The structure of the assembly can be modified, particularly as to the fittings coupled thereby. Where a stopper is to be provided, the elastomer of the cylinder need have no open central passage and a closed backup member can be employed in place of the tubular fitting of FIGS. 1 through 5. Where desired to hose fitting can be coupled to the rear fitting of the coupling at an angle to the tube receiving bore, as at right angles. While the quick release swivel and its orientation to the tube grip control handle is of great advantage in many applications, other connections including conventional threaded connections can also be made to the coupling barrel.

In view of the many variations which suggest themselves as applicable to the coupling and unit of this invention it is to be understood that the above disclosure is to be read as illustrative and not in a restrictive sense.

What is claimed is:

1. A tube coupling comprising a barrel having a bore at one end, an uninterrupted smooth walled right-circular cylindrical tube received in said bore, a generally right-circular cylindrical grip pin, said barrel having a bore for reception of said grip pin intersecting said tube receiving bore whereby said pin when mounted in said grip pin receiving bore is spaced from said diametrically opposed tube receiving bore wall less than the diameter of the smooth walled right-circular cylindrical tube which said bore is adapted to receive, said grip pin being mounted in said grip pin receiving bore for rotation about its longitudinal axis, said grip pin when mounted in the grip pin receiving bore with a first angular position about its axis having a region in registry with said tube receiving bore which clears said tube receiving bore, a grip element on said grip pin associated with said bore clearing region of said pin with said grip element engaging with said smooth walled right-circular cylindrical tube inserted in said tube receiving bore, means in said barrel for resiliently biasing a tube inserted in said tube receiving bore toward said one end, said grip element engaging a smooth wall portion of said smooth walled right-circular cylindrical tube inserted in said tube receiving bore when said element is over center of said grip pin longitudinal axis toward said biasing means whereby said biasing means tends to increase the gripping force on a tube in said tube receiving bore while displacing said tube toward said one end.

2. A tube coupling according to claim 1 wherein said grip element is in the intersection of said bore clearing region with the right-circular cylindrical surface of said pin.

3. A tube coupling according to claim 1 including means secured to said grip pin for rotating said pin between the tube receiving bore clearing position and the tube engaging position.

4. A tube coupling according to claim 3 including biasing means tending to rotate said grip pin toward said tube gripping position.

5. A tube coupling comprising a barrel having a first bore at one end for the reception of a smooth walled right-circular cylindrical tube and having a second bore of greater diameter than said tube receiving bore extending from a second end opposite said one end to said tube receiving bore and coaxial with said tube receiving bore, a generally right-circular cylindrical grip pin, said barrel having a bore for reception of said grip pin intersecting said tube receiving bore whereby said pin when mounted in said grip pin receiving bore is spaced from said diametrically opposed tube receiving bore wall less than the diameter of the smooth walled right-circular cylindrical tube which said bore is adapted to receive, said grip pin being mounted in said grip pin receiving bore for rotation about its longitudinal axis, said grip pin when mounted in the grip pin receiving bore with a first angular positon about its axis having a region in registry with said tube receiving bore which clears said tube receiving bore, a grip element on said grip pin associated with said bore clearing region of said pin adapted for engagement with a smooth walled right-circular cylindrical tube inserted in said tube receiving bore, a resilient seal cylindrical in said second bore, a seal backup element abutting the end of said seal cylinder proximate said second end of said barrel, and means to releasably secure said backup element to said barrel, said seal cylinder resiliently biasing a tube inserted in said tube receiving bore toward said one end, said grip element being adapted to engage a smooth walled portion of a smooth walled right-circular cylindrical tube inserted in said tube receiving bore when said element is over center of said grip pin longitudinal axis toward said second end whereby the biasing force of said seal cylinder acting on a tube in said tube receiving bore tends to increase the gripping force on said tube while displacing said tube toward said one end.

6. A tube coupling according to claim 5 wherein said seal cylinder has a coaxial passage and said backup element has a passage therethrough in registry with said coaxial passage.

7. A tube coupling according to claim 6 including a seal bead protruding from said cylinder abutting surface of said backup element and extending around the entrance to said passage in said backup element to close upon itself to engage the end of said seal cylinder over a closed path.

8. A tube coupling according to claim 5 wherein said seal backup element is rotatable around the longitudinal axis of said tube receiving bore while secured in abutting relationship to said seal cylinder.

9. A tube coupling according to claim 7 wherein said seal bead is circular and concentric with the longitudinal axis of said tube receiving bore and wherein said seal element is rotatable around the longitudinal axis of said tube receiving bore while secured in abutting relationship to said seal cylinder.

10. A tube coupling according to claim 5 wherein said backup element is a stub cylinder extending into said second bore, a locking pin for said backup element, said barrel having a locking pin receiving bore intersecting said second bore whereby said pin when mounted in said bore extends across a cross-sectional chord of said second bore in the region containing said stub cylinder, said stub cylinder having a groove registering with said locking pin for reception of said pin.

11. A tube coupling according to claim 10 wherein said groove in said stub cylinder extends around the circumference thereof normal to the longitudinal axis thereof whereby said stub cylinder is rotatable with respect to said barrel while engaged by said locking pin.

12. A tube coupling according to claim 11 wherein said locking pin is rotatable about its longitudinal axis and has a relieved region which is clear of said second bore when rotated to an unlocked position.

13. A tube coupling comprising a barrel having a first bore at one end, an uninterrupted smooth walled right-circular cylindrical tube received in said first bore, a generally right-circular cylindrical grip pin having a given diameter, said barrel having a tube receiving end at said one end which defines the limit of all elements of said coupling along the longitudinal axis of said bore toward said one end, said barrel having a bore for reception of said grip pin intersecting said tube receiving bore whereby said pin when mounted in said grip pin receiving bore is spaced from said diametrically opposed tube receiving bore wall less than the diameter of the smooth walled right-circular cylindrical tube which said bore is adapted to receive and the axis of said grip pin is a plane normal to said tube receiving bore spaced from said tube receiving end of said barrel less than said given diameter, said grip pin being mounted in said grip pin receiving bore for rotation about its longitudinal axis, said grip pin when mounted in the grip pin receiving bore with a first angular position about its axis having a region in registry with said tube receiving bore which clears said tube receiving bore, a grip element on said grip pin adjacent said bore clearing region of said pin engaging with said smooth walled right-circular cylindrical tube inserted in said tube receiving bore, said grip element engaging a smooth wall portion of said smooth walled right-circular cylindrical tube inserted in said tube receiving bore when said element is over center of said grip pin longitudinal axis toward the end of said tube receiving bore opposite said one end, whereby forces tending to bias a tube inserted in said tube receiving bore toward said one end tend to increase the gripping force on said tube.

14. A tube coupling comprising a barrel having a bore at one end for the reception of a smooth walled right-circular cylindrical tube, first and second generally right-circular cylindrical grip pins, said barrel having first and second bores for reception of said first and second grip pins each intersecting said tube receiving bore whereby said pins when mounted in said respective grip pin receiving bores are spaced from said diametrically opposed tube receiving bore wall portions less than the diameter of the smooth walled right-circular cylindrical tube which said bore is adapted to receive, said first and second grip pins being mounted in said first and second grip pin receiving bores respectively for rotation about their longitudinal axes, said grip pins when mounted in their respective grip pin receiving bores with a first angular position about their axes having a region in registry with said tube receiving bore which clears said tube receiving bore, a grip element on each of said grip pins associated with their respective bore clearing regions of said pins and adapted for engagement with a smooth walled right-circular cylindrical tube inserted in said tube receiving bore, said grip elements each being adapted to engage a smooth walled portion of a smooth walled right-circular cylindrical tube inserted in said tube receiving bore when said grip elements are over center of their respective grip pin longitudinal axis toward the end of said tube receiving bore opposite said one end, whereby forces tending to bias a tube inserted in said tube receiving bore toward said one end tend to increase the gripping force of each grip element on said tube.

15. A tube coupling according to claim 14 including means secured to each of said first and second grip pins for rotating each of said pins between the tube receiving bore clearing position and the tube engaging position.

16. A tube coupling according to claim 15 including means to couple rotationally the rotating means for one pin with the rotating means for the other pin whereby said pins are rotated in unison.

17. A tube coupling according to claim 1 wherein said tube receiving bore clearing region of said grip pin has at least two intersecting facets on said pin to form at their intersection a crown region extending longitudinally of said grip pin, and wherein said grip element is defined by the crown region.

18. A tube coupling according to claim 17 wherein said crown region when exposed in said tube receiving bore has a central portion spaced from the tube in said bore whereby said crown region engages the tube at spaced locations.

19. A tube coupling according to claim 5 wherein said means to releasably secure said backup element to said barrel includes a cylindrical member closely fitting within said second bore, a groove in said cylindrical member, a lock pin for said second member, said barrel having a lock pin receiving bore intersecting said second bore and said groove in said cylindrical member when mounted in said second bore whereby said lock pin engages the walls of said groove to retain said cylindrical member in said bore.

20. A tube coupling according to claim 19 wherein said groove extends circumferentially of said cylindrical member, said lock pin is rotatable in said lock pin receiving bore, said lock pin is cut away to clear said second bore when in one rotational position, and including detenting means for maintaining the rotational position of said lock pin in the positions to extend into and clear said second bore.

* * * * *